(12) United States Patent
Khaliullin

(10) Patent No.: US 7,862,232 B2
(45) Date of Patent: Jan. 4, 2011

(54) TEMPERATURE SENSOR, DEVICE AND SYSTEM INCLUDING SAME, AND METHOD OF OPERATION

(75) Inventor: Nail Khaliullin, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 433 days.

(21) Appl. No.: 11/862,831

(22) Filed: Sep. 27, 2007

(65) Prior Publication Data

US 2009/0086788 A1    Apr. 2, 2009

(51) Int. Cl.
   *G01K 7/00*    (2006.01)
(52) U.S. Cl. .................. 374/175; 374/171; 374/184
(58) Field of Classification Search .......... 374/171, 374/184, E7.037, 175
See application file for complete search history.

(56) References Cited

U.S. PATENT DOCUMENTS

| | | | |
|---|---|---|---|
| 3,937,086 A | 2/1976 | von Thuna | |
| 5,228,780 A * | 7/1993 | Shepard et al. | 374/175 |
| 5,746,511 A * | 5/1998 | Eryurek et al. | 374/2 |
| 6,021,172 A | 2/2000 | Fossum et al. | |
| 6,071,009 A | 6/2000 | Clyne | |
| 6,273,605 B1 | 8/2001 | Clyne | |
| 6,447,162 B2 | 9/2002 | Clyne | |
| 6,507,328 B1 | 1/2003 | Lee | |
| 6,652,138 B2 | 11/2003 | Clyne | |
| 6,861,634 B2 | 3/2005 | Rossi | |
| 6,974,973 B2 | 12/2005 | Rossi et al. | |
| 7,084,695 B2 | 8/2006 | Porter | |
| 7,180,211 B2 | 2/2007 | Sinha et al. | |
| 7,188,036 B2 | 3/2007 | Strittmatter | |
| 7,212,053 B2 | 5/2007 | Gomm et al | |
| 7,230,479 B2 | 6/2007 | Forbes et al. | |
| 7,235,773 B1 | 6/2007 | Newman | |
| 7,298,151 B2 * | 11/2007 | Kapusta et al. | 324/613 |
| 2003/0137474 A1 | 7/2003 | Lee | |
| 2004/0170215 A1 * | 9/2004 | Rossi et al. | 374/183 |
| 2007/0140315 A1 | 6/2007 | Janzen et al. | |
| 2007/0152649 A1 | 7/2007 | Liu | |
| 2007/0159237 A1 | 7/2007 | Zimlich | |
| 2009/0140125 A1 * | 6/2009 | Takayama | 250/214 R |

* cited by examiner

*Primary Examiner*—Lisa M. Caputo
*Assistant Examiner*—Jonathan Dunlap
(74) *Attorney, Agent, or Firm*—TraskBritt

(57) ABSTRACT

A temperature sensor and device and system including same, comprise a switched capacitor circuit configured to generate a noise voltage in response to switching and circuitry configured to generate a relative temperature output signal proportional to an absolute temperature output signal in response to the noise voltage. The device includes a temperature sensor, temperature sensitive device logic and temperature compensation logic configured to receive the absolute temperature and generate an adjustment signal to adapt the temperature sensitive device logic in response thereto. A related method for sensing temperature includes amplifying a noise voltage from a switched capacitor circuit in a plurality of parallel amplifier channels and removing amplifier noise from each of the plurality of parallel amplifier channels to form a relative output signal proportional to an absolute temperature.

19 Claims, 4 Drawing Sheets

TEMPERATURE SENSOR, DEVICE AND SYSTEM INCLUDING SAME, AND METHOD OF OPERATION

FIELD OF INVENTION

Embodiments of the present invention relate generally to semiconductor devices and, in particular, to semiconductor devices including temperature sensitive circuitry employing temperature compensation, to operation of such devices, and to systems including devices with temperature sensitive circuitry.

BACKGROUND

In modern semiconductor devices, there is often a need to monitor the temperature of a device during operation. Temperature monitoring may be useful in a wide variety of circumstances. For example, it may be useful to cease or modify operations associated with a semiconductor device when excessive heat buildup is detected because rising temperatures may lead to reduced performance or even damage to the semiconductor device. Additionally, the monitored temperature may be used to control the operation of cooling devices, such as fans or refrigeration devices.

Alternatively, in some applications, the semiconductor device may be designed to operate within a preselected temperature range and thus heating or cooling may be required. To maintain operation of the device at a target temperature it may be useful to monitor the temperature and then increase/decrease heating or cooling, as needed, to maintain the desired operating temperature. In other applications, the operating characteristics of the semiconductor device may change with increasing temperatures. Therefore, it may be useful to monitor the temperature of the device and accommodate its operating characteristics at a particular temperature.

Conventional temperature sensors have a variety of shortcomings. For example, conventional temperature sensors consume excessive power. Power consumption is a significant factor in electronic devices. It is desirable to reduce power consumption when implementing certain applications. In particular, wireless and battery operated equipment require lower power consumption designs to operate for acceptably long periods of time.

Conventional temperature sensors are also known to produce significant heat, contributing to the heating issues discussed above. Temperature sensors hat produce significant heat are difficult to incorporate within a common substrate with a semiconductor device, such as semiconductor memory, microprocessors, digital signal processors, and the like. Temperature sensors that are formed in a separate semiconductor device are expensive and prone to performance variations that arise from differences in manufacturing parameters. Furthermore, other conventional temperature sensors that use P-N junction parameters, while highly sensitive to temperature change, are sensitive to process deviations and may require extensive calibration of each individual die for proper operation.

Also, there is a drive within the electronics industry to design smaller and more efficient electronic circuitry for many devices, such as cameras, personal digital assistants (PDAs), wireless telephones, cellular phones, portable computers, portable sensors and a variety of small, hand-held electronic equipment. Conventional temperature sensors tend to be relatively large devices that consume substantial semiconductor real estate. The size of these temperature sensors renders their incorporation into a common substrate with the semiconductor device impractical.

As a result, there is a need for a compact temperature sensor that can be readily incorporated into the structure of a semiconductor die and provide an absolute temperature for use in modifying the performance of temperature sensitive circuitry.

BRIEF DESCRIPTION OF THE SEVERAL VIEWS OF DRAWINGS

DETAILED DESCRIPTION

Conventional temperature sensors are based on temperature dependence of the P-N junction parameters and exhibit desirable high temperature sensitivity. However, due to process parameter deviations, P-N junction based temperature sensors must be calibrated for each die. A basic calibration problem is that, in operation, the actual operational power consumption of the die raises the actual die temperature by several degrees, DT, above the ambient temperature during conventional calibration. This temperature differential or difference, DT, usually remains unknown.

Embodiments for a temperature sensor, device, system and method for sensing temperature are described. The various embodiments utilize a capacitor-based temperature sensor that provides a reduction in deviation occurring in die-to-die sensor sensitivity. Furthermore, the capacitor-based temperature sensor approach results in a simplification of calibration of each of the individual die. While the various embodiments illustrate one application of the temperature sensor in electronic devices, the temperature sensors also find application in other electronic devices needing performance alterations based upon the actual operating temperature.

The temperature sensor of the various embodiments disclosed herein is highly reproducible and utilizes an improved calibration procedure. The temperature sensor described herein performs an analysis of a temperature-varying characteristic of a switched capacitor. The resistance of a toggling switch produces a noise voltage on the capacitor when configured in a switched capacitor arrangement. This noise voltage varies with the temperature and its Mean Squared value is proportional to the absolute temperature. Accordingly, the noise voltage, referred to herein as $V_{kTC}$, appears as a noise voltage on the switched capacitor and it's Mean Squared value varies according to $\overline{V^2}_{kTC} = kT/C$ where k—Boltzmann's constant.
  C—Capacitor value,
  T—Absolute temperature (K).

Figure 1:
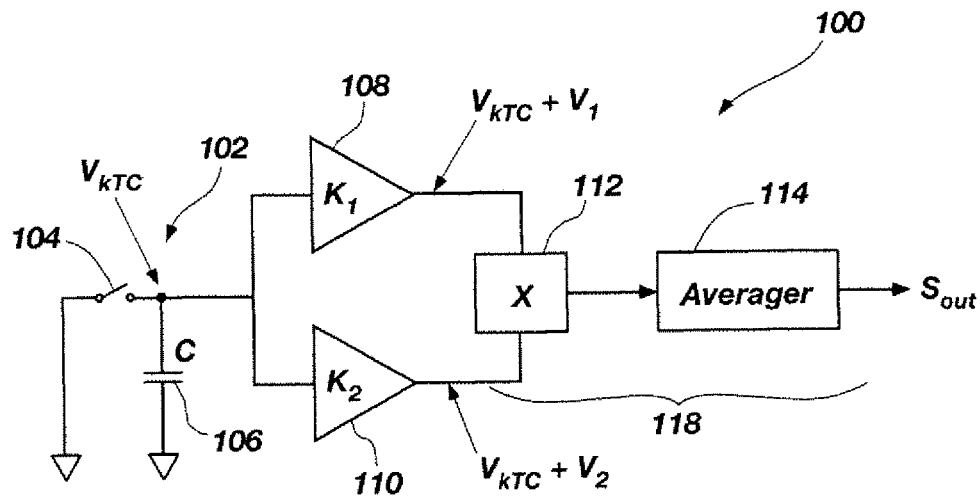
FIG. 1 is a circuit diagram of a relative temperature sensor, in accordance with an embodiment of the present invention.

FIG. 1 is a circuit diagram of a relative temperature sensor, in accordance with an embodiment of the present invention. A relative temperature sensor 100 includes switched capacitor circuit 102, which, during operation, generates a noise voltage $V_{kTC}$. The switched capacitor circuit 102 includes a switch 104 electrically coupled in parallel to a capacitor 106. The switch 104 is coupled to a ground potential on one end thereof such that the other, switched end displays the noise voltage $V_{kTC}$.

As stated, the noise voltage $V_{kTC}$ varies with the temperature and its Mean Squared value is proportional to the absolute temperature. When the switch 104 is periodically switchably connected to the capacitor 106, the noise voltage $V_{kTC}$ is generated with the Root Mean Squared (RMS) calculation of the noise voltage $V_{kTC}$ being given by formula:

$$\sigma_{kTC} = \sqrt{\overline{V_{kTC}^2}} = \sqrt{\frac{kT}{C}}.$$

Since the noise voltage $V_{kTC}$ is such a small signal, the noise voltage $V_{kTC}$ must be amplified in order to be evaluated. However, an amplifier, by its nature, also generates other noise voltages that could alter the actual value of the temperature-variable switched capacitor noise voltag $V_{kTC}$. Accordingly, the relative temperature sensor 100 further includes a plurality of amplifiers 108, 110 electrically coupled in parallel for individually amplifying the switched capacitor noise voltage $V_{kTC}$. An amplifier 108 having an amplifier gain of K1 and an amplifier 110 having an amplifier gain of K2 generate respective intrinsic amplifier noise voltages $V_1$, $V_2$ that are additive to the switched capacitor noise voltage $V_{kTC}$.

In order to remove the respective intrinsic amplifier noise voltages $V_1$, $V_2$, the output signals $V_{kTC}+V_1$ and $V_{kTC}+V_2$ are processed by an amplifier noise reducer circuit 118 including, in the present embodiment, a multiplier 112 for multiplying the output signals $V_{kTC}+V_1$ and $V_{kTC}+V_2$ and an averager 114 for averaging the product therefrom. The resultant relative temperature output signal, $S_{out}$, is given by the equation:

$$S_{out} = K_1 \cdot K_2 \cdot \overline{(V_{kTC}+V_1) \cdot (V_{kTC}+V_2)} = K_1 \cdot K_2 \cdot (\overline{V_{kTC}^2} + \overline{V_{kTC} \cdot V_1} + \overline{V_{kTC} \cdot V_2} + \overline{V_1 \cdot V_2})$$

where:
K1, K2—the first and second amplifiers gain, respectively, and
V1, V2—the first and second amplifiers temporal noise, respectively.

Accordingly, $V_{kTC}$, $V_1$ and $V_2$ are not correlated between each other. Furthermore, after averaging.

$$\overline{V_{kTC} \cdot V_1} + \overline{V_{kTC} \cdot V_2} + \overline{V_1 \cdot V_2} \ll \overline{V_{kTC}^2} \text{ so,}$$

$$S_{out} \approx K_1 \cdot K_2 \cdot \overline{V_{kTC}^2} = K_1 \cdot K_2 \cdot \frac{kT}{C} = G \cdot T$$

where G is a calibration factor.

Accordingly, the relative temperature output signal $S_{out}$ is proportional to absolute temperature T. The calibration factor C depends on the selected value C of capacitor 106 and the gain, K1 and K2, of amplifiers 108, 110. Therefore, the variation in the semiconductor die-to-die calibration factor depends on C, K1 and K2 variation.

Figure 2:
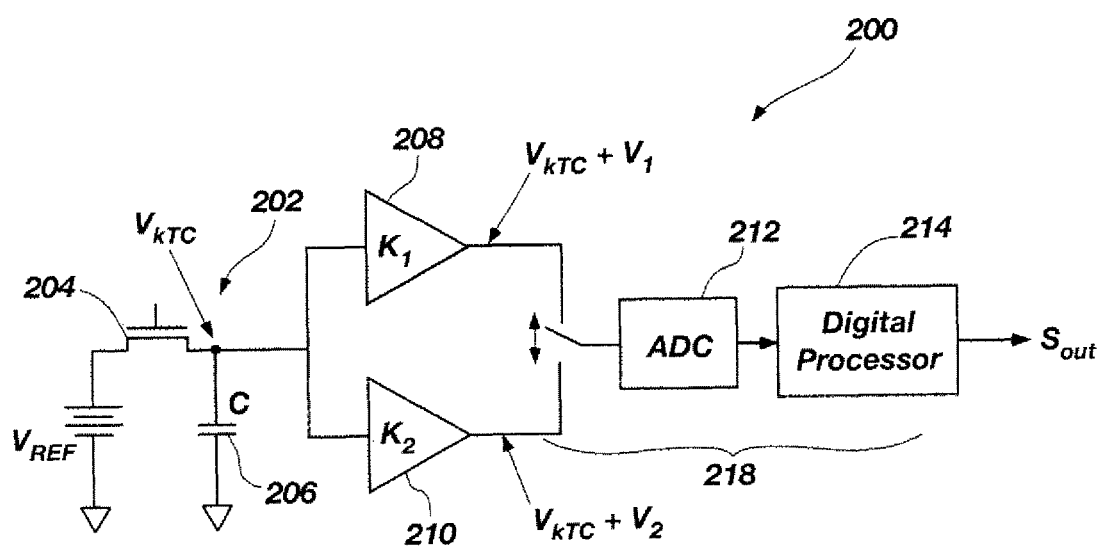
FIG. 2 is a circuit diagram of a relative temperature sensor, in accordance with another embodiment of the present invention.

FIG. 2 is a circuit diagram of a relative temperature sensor, in accordance with another embodiment of the present invention. A relative temperature sensor 200 includes a switched capacitor circuit 202 that during operation generates a noise voltage $V_{kTC}$. The switched capacitor circuit 202 includes a switch 204 electrically coupled in parallel to a capacitor 206. In the present embodiment, switch 204 is configured as a Field Effect Transistor (FET), which is clocked by a clock signal $V_{SW}$ at a periodic frequency. The switch 204 is coupled to a reference potential $V_{REF}$ on one end such that the other switched end displays the noise voltage $V_{kTC}$. It should be noted that the switched capacitor circuits 102, 202 may be substituted into either embodiments of relative temperature sensors 100, 200.

As stated, the noise voltage $V_{kTC}$ varies with the temperature and its Mean Squared value proportional to the absolute temperature. When the switch 204 is periodically switchably connected to the capacitor 206, the noise voltage $V_{kTC}$ is generated as described above. The small signal of the noise voltage $V_{kTC}$ of FIG. 2 is also amplified in order to be evaluated. Similar to FIG. 1, amplifiers 208, 210 generate noise voltages that must be addressed. The relative temperature sensor 200 further includes the plurality of amplifiers 208, 210 electrically coupled in parallel for individually amplifying the switched capacitor noise voltage $V_{kTC}$. The amplifier 208 having an amplifier gain of K1 and the amplifier 210 having an amplifier gain of K2 generate respective intrinsic amplifier noise voltages $V_1$, $V_2$ that are additive to the switched capacitor noise voltage $V_{kTC}$.

In the present embodiment, the respective intrinsic amplifier noise voltages $V_1$, $V_2$ are removed according to digital signal processing techniques. Accordingly, the output signals $V_{kTC}+V_1$ and $V_{kTC}+V_2$ are processed by m amplifier noise reducer circuit 218 including, in the present embodiment, an Analog-to-Digital Converter (ADC) 212 for alternatingly sampling the output signals $V_{kTC}+V_1$ and $V_{kTC}+V_2$ and a digital signal processor 214 for generating the resultant relative temperature output signal, $S_{out}$, as described above. The amplified signals in each of the channels of amplifiers 208, 210, are converted by the ADC 212 into two respective sequences:

$$X_n, X_{n+1}, X_{n+2} \ldots \text{ and } Y_n, Y_{n+1}, Y_{n+2} \ldots$$

In order to exclude the amplifier noise voltages $V_1$, $V_2$, and amplifier offset voltages the digital processor 214 converts the sequences of X and Y into $A_n = X_n - X_{n-1}$ and $B_n = Y_n - Y_{n-1}$ and then correlates the A and B sequences. All required calculations can be made by the digital processor 214 to generate the resultant relative temperature output signal $S_{out}$, as described above.

Figure 3:
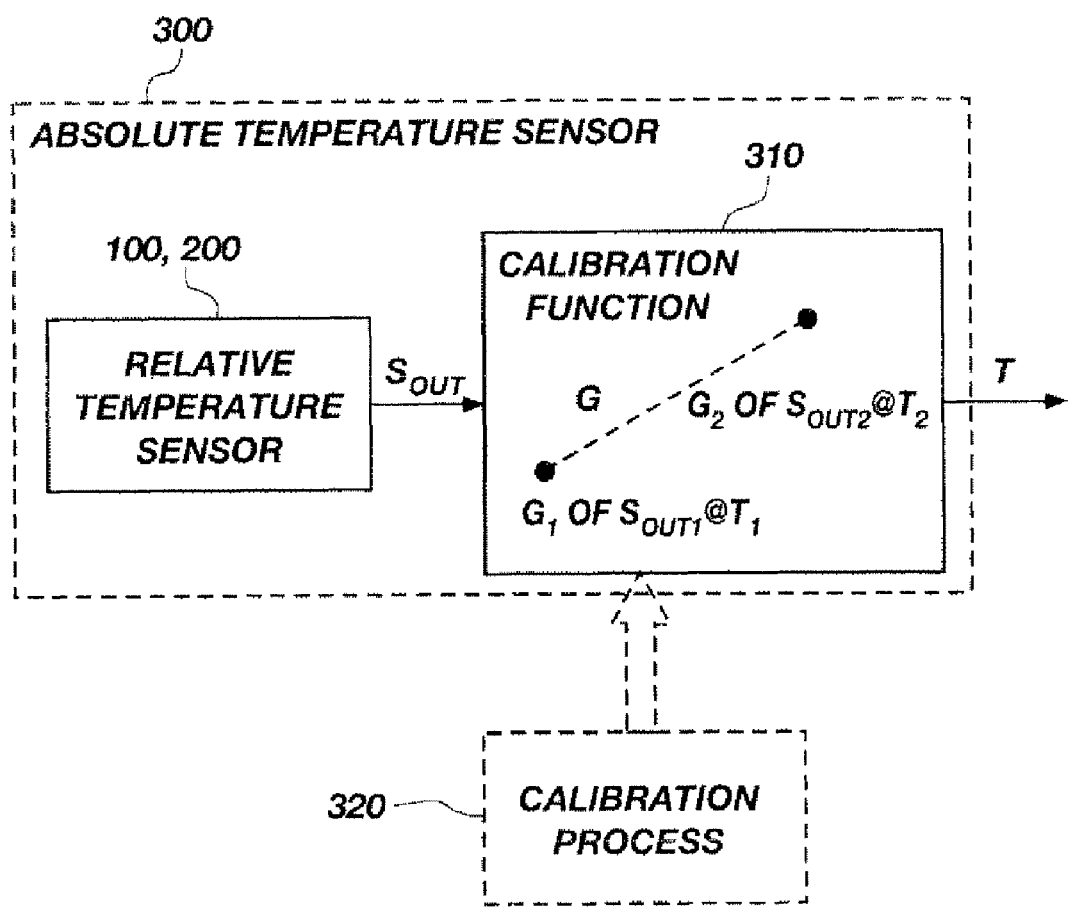
FIG. 3 is a circuit diagram of an absolute temperature sensor, in accordance with an embodiment of the present invention.

FIG. 3 is a circuit diagram of an absolute temperature sensor, in accordance with an embodiment of the present invention. The relative temperature sensors 100, 200 described above generate a relative temperature output signal $S_{out}$ that correlates to the absolute temperature T according to a variable that is specific to the process and component variations of the relative temperature sensor 100, 200. Accordingly, the absolute temperature sensor 300 is subjected to a calibration process 320 in order to determine the variable (e.g., a calibration factor G) used to calculate the absolute temperature T from the relative temperature output signal $S_{out}$.

Furthermore, the actual temperature on the relative temperature sensor 100, 200 is several degrees higher that the ambient temperature. Such a difference is commonly referred to as temperature differential DT and is usually unknown. By way of example and not limitation, it is assumed that over the temperature range, the temperature differential DT is constant. Therefore, the calibration factor G may be determined by measuring the relative temperature output signal $S_{out}$ at two ambient temperatures, T1 and T2, to determine:

$$S_{out1} = G*(T1+DT)$$
$$S_{out2} = G*(T2+DT)$$
$$\downarrow$$
$$G = (S_{out1} - S_{out2})/(T1-T2)$$

Specifically, calibration process 320, in one embodiment, subjects the relative temperature sensor 100, 200 to a first known temperature T1. The selection of a suitable first known ambient temperature T1 may be from one end of the operational temperature range of temperate sensitive device circuitry for which the absolute temperature sensor 300 is utilized.

During the calibration process 320, the relative temperature sensor 100, 200 is subjected to the first known ambient temperature T1 and a calibration factor G1 is determined when the absolute temperature T is equal to G1 times the relative temperature output signal $S_{out}$. The calibration factor G1 is stored as part of a calibration function 310 corresponding to the specific variations of that specific relative temperature sensor 100, 200.

Calibration process 320 continues by generating at least one other data point in the calibration function 310 from which other intermediate points may be calculated or inferred. Specifically, calibration process 320 subjects the relative temperature sensor 100, 200 to a second known ambient temperature T2. The selection of a suitable second known ambient temperature T2 may be from the other end of the operational temperature range of temperature sensitive device circuitry for which the absolute temperature sensor 300 is utilized.

During the calibration process 320, the relative temperature sensor 100, 200 is subjected to the second known ambient temperature T2 and a calibration factor G2 is determined when the absolute temperature T is equal to G2 times the relative temperature output signal $S_{out}$. The calibration factor 62 is stored as part of a calibration function 310 corresponding to the specific variations of that specific relative temperature sensor 100, 200. The calibration process 320 completes upon the generation of at least two data points, G1 and G2, in the calibration function 310 from which other calibration factors G may be calculated for different values of relative temperature output signals $S_{out}$.

Accordingly, an operational relative temperature sensor 100, 200 responds to an operational ambient temperature by generating the relative temperature output signal $S_{out}$. The calibration function 310 determines a calibration factor G from which to calculate the absolute temperature T. By way of example and not limitation, calibration function 310 may take the form of analog, digital, or computational circuitry.

Furthermore, calibration function 310 may further comprise digitization circuitry for enabling a sampled relative temperature output signal $S_{out}$ to be processed by an external processor and returned to the absolute temperature sensor 300 for use by temperature sensitive device circuitry. Other configurations for implementing and processing a calibration function are also contemplated and considered to be within the scope of the present invention.

Figure 4:
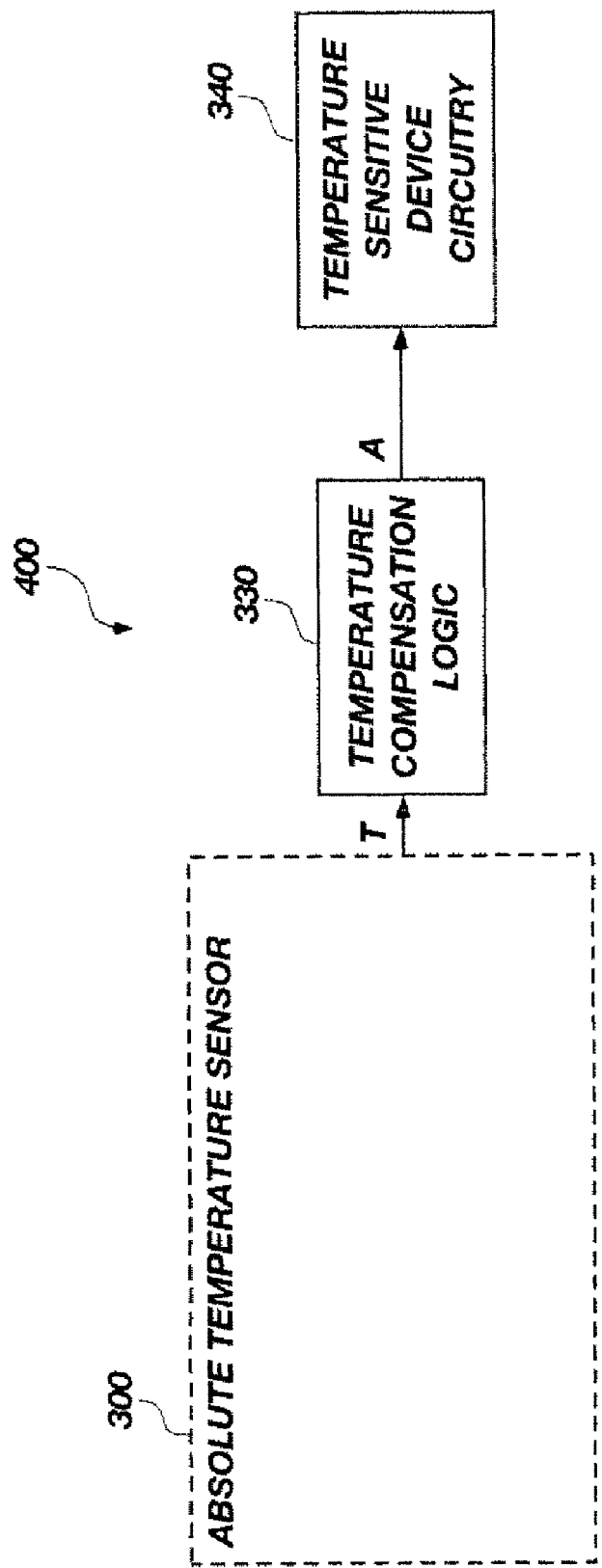
FIG. 4 is a block diagram of a device responsive to temperature change, in accordance with an embodiment of the present invention.

FIG. 4 is a block diagram of a semiconductor device responsive to temperature change, in accordance with an embodiment, of the present invention. A semiconductor device 400 includes temperature sensitive device circuitry 340, the performance of which undesirably varies with changes in the device's ambient temperature. Various examples of temperature sensitive inputs and outputs as well as of device circuitry include temperature sensitive bias voltages or current, reference voltages or currents, regulators, comparators, photosensitive circuits, threshold voltages or currents, as well as various other circuits and structures known by those of ordinary skill in the art.

The semiconductor device 400 further includes temperature compensation logic 330 for receiving the absolute temperature T from the absolute temperature sensor 300 and generating an adjustment signal A in response thereto. The temperature compensation logic 330 is matched to the specific need of the temperature sensitive device circuitry 340. For example, if a specific performance parameter in the temperature sensitive device circuitry 340 varies in response to changes in ambient temperature according to a determined or known function, the temperature compensation logic 330 includes logic (e.g., analog, digital, tabular, or computational logic) for generating an appropriate adjustment A to the temperature sensitive device circuitry 340 in response to a received absolute temperature T as determined by the absolute temperature sensor 300.

Figure 5:
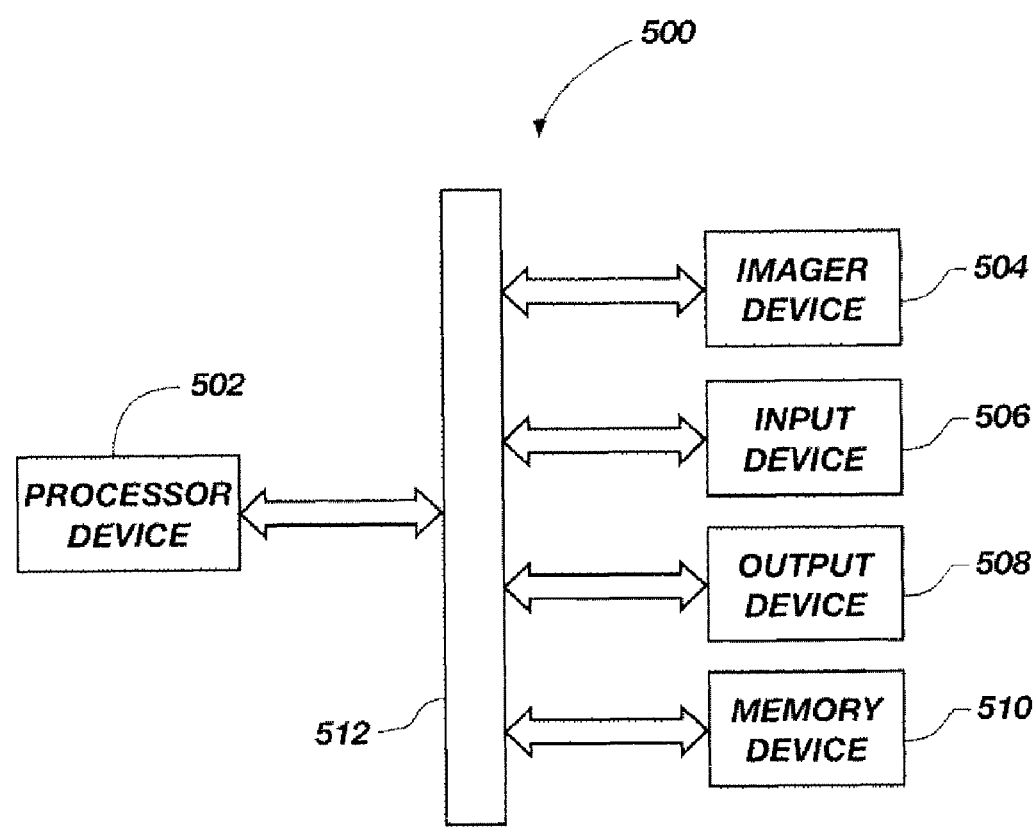
FIG. 5 illustrates a system diagram of one or more devices that may include temperature sensitive device circuitry, in accordance with an embodiment of the present invention.

FIG. 5 illustrates a system diagram of one or more semiconductor devices that may include temperature sensitive device circuitry, in accordance with an embodiment of the present invention. A system 500 includes one or more semiconductor devices, which cooperatively interact via a bus 512. Systems 500 in which embodiments of the present invention have application may include computer or electronic systems such as a camera, wireless or cellular telephone, audio/video players and recorders, etc. The system 500 includes one or more devices such as a processor device 502, an imager device 504, an input device 506, an output device 508 and a memory device 510. The system 500 includes at least one device 502-510 that includes temperature sensitive device circuit 340 (FIG. 4) responsive to an absolute temperature sensor 300 (FIG. 4) and temperature compensation logic 330 (FIG. 4) carried on the device.

Embodiments of a temperature sensor, device, system and method have been disclosed. In one embodiment described hereinabove, a temperature sensor includes a switched capacitor circuit and at least one noise voltage amplifier. The noise voltage amplifier includes an input coupled to the switched capacitor circuit to amplify a noise voltage generated by the switched capacitor circuit during operation. The temperature sensor further includes an amplifier noise reducer circuit coupled to each noise voltage amplifier to remove amplifier noise from the noise voltage amplifier and to generate a relative temperature output signal proportional to an absolute temperature. In another embodiment, a temperature sensor includes a switched capacitor circuit configured to generate a noise voltage in response to periodic switching and circuitry configured to generate a relative temperature output signal proportional to an absolute temperature output signal in response to the noise voltage.

In another embodiment, a semiconductor device includes a temperature sensor configured to determine an absolute temperature from noise voltage generated by a switched capacitor circuit. The device further includes temperature sensitive device logic and temperature compensation logic configured to receive the absolute temperature and generate an adjustment signal to adapt the temperature sensitive device logic in response thereto.

In system and method embodiments, the system includes a processor and at least one other device operably coupled to the processor. The at least one of the processor and the at least one other device includes a temperature sensitive device logic and a temperature sensor configured to generate an adjustment to the temperature sensitive device logic in response to temperature variations in a noise voltage of a switched capacitor. A method embodiment for sensing temperature includes amplifying a noise voltage from a switched capacitor circuit in a plurality of parallel amplifier channels and removing amplifier noise from each of the plurality of parallel amplifier channels to form a relative output signal proportional to an absolute temperature.

The processes and devices described above illustrate selected embodiments of methods and devices of many that may be used and produced in accordance with the invention. However, it is not intended that the present invention be limited to the above-described and illustrated embodiments. Any modification, though presently unforeseeable, of the present invention that comes within the scope of the following claims and their legal equivalents is encompassed by the present invention.

What is claimed is:

1. A temperature sensor, comprising:
    a switched capacitor circuit configured for generating a noise voltage used in generating a relative temperature output signal;
    a plurality of noise voltage amplifiers, each noise voltage amplifier of the plurality including an input coupled to the switched capacitor circuit to amplify the noise voltage; and
    an amplifier noise reducer circuit coupled to the plurality of noise voltage amplifiers and configured to remove amplifier noise from at least one noise voltage amplifier of the plurality and to generate the relative temperature output signal, wherein the amplifier noise reducer circuit comprises a multiplier coupled to outputs of each of the plurality of noise voltage amplifiers, the multiplier configured to multiply the outputs including an amplified noise voltage and the respective amplifier noise from the respective one of the plurality of noise voltage amplifiers.

2. The temperature sensor of claim 1, wherein the plurality of noise voltage amplifiers is configured as a plurality of parallel channels, each channel of the plurality configured to generate an uncorrelated amplifier noise.

3. The temperature sensor of claim 1, wherein plurality of noise voltage amplifiers includes at least two noise voltage amplifiers with different amplifier gains.

4. The temperature sensor of claim 1, wherein the amplifier noise reducer circuit further comprises an averager coupled to an output of the multiplier and configured to average the output of the multiplier including an amplified noise voltage and the respective amplifier noise from the respective one of the plurality of noise voltage amplifiers, wherein the averager is further configured to generate the relative temperature output signal.

5. The temperature sensor of claim 1, further comprising a calibration function configured to convert the relative temperature output signal into an absolute temperature.

6. The temperature sensor of claim 5, wherein the calibration function further comprises at least two calibration factors corresponding to at least two known temperatures.

7. The temperature sensor of claim 1, wherein the temperature sensor is formed on a common substrate in association with temperature sensitive device circuitry configured to be responsive to a temperature output signal of the temperature sensor.

8. A temperature sensor, comprising:
    a switched capacitor circuit configured to generate a noise voltage in response to periodic switching; and
    circuitry configured to generate a relative temperature output signal proportional to an absolute temperature output signal in response to the noise voltage.
    a calibration function configured to scale the relative temperature output signal into the absolute temperature output signal, wherein the calibration function comprises at least two calibration factors corresponding to at least two known temperatures.

9. A device, comprising:
    a temperature sensor configured to determine an absolute temperature from a noise voltage generated by a switched capacitor circuit, wherein the temperature sensor comprises a calibration function configured to scale a relative temperature output signal derived, at least in part, from the switched capacitor circuit into the absolute temperature, the calibration function comprising at least two calibration factors corresponding to at least two known temperatures;
    temperature sensitive device logic; and
    temperature compensation logic configured to receive the absolute temperature and generate an adjustment signal to adapt the temperature sensitive device logic in response thereto.

10. The device of claim 9, wherein the temperature sensor comprises at least two parallel amplifier channels commonly coupled to each amplify the noise voltage generated by the switched capacitor.

11. The device of claim 10, wherein the temperature sensor further comprises an amplifier noise reducer circuit configured to generate a relative temperature output signal by removing amplifier noise generated in the at least two parallel amplifier channels.

12. The device of claim 11, wherein the amplifier noise reducer circuit is configured to remove the amplifier noise by multiplying together outputs from each of the at least two parallel amplifier channels and averaging the result to generate a relative temperature output signal proportional to the absolute temperature.

13. The device of claim 10, wherein the amplifier noise reducer circuit is configured to remove the amplifier noise by digitally processing outputs from each of the at least two parallel amplifier channels to remove amplifier noise generated in the at least two parallel amplifier channels and to generate a relative temperature output signal proportional to the absolute temperature.

14. The device of claim 9, wherein the temperature sensor and the temperature sensitive device logic are formed on a common substrate.

15. The device of claim 9, wherein the temperature sensitive device logic comprises an imaging sensor.

16. A system, comprising:
    a processor; and
    at least one device operably coupled to the processor, the at least one device including:
        temperature sensitive device logic; and
        a temperature sensor configured to generate an adjustment to the temperature sensitive device logic in response to temperature-induced variations in a noise voltage of a switched capacitor, wherein the adjustment is based at least in part on a calibration function of the temperature sensor configured to scale a relative temperature output signal derived at least in art from the switched capacitor into an absolute temperature, the calibration function comprising at least two calibration factors corresponding to at least two known temperatures.

17. The system of claim 16, wherein the at least one device is an imager.

18. A method for sensing temperature, comprising:
amplifying a noise voltage from a switched capacitor circuit in a plurality of parallel amplifier channels; and
removing amplifier noise from each of the plurality of parallel amplifier channels to form a relative output signal proportional to an absolute temperature, wherein removing amplifier noise comprises:
multiplying output signals from each of the plurality of parallel amplifier channels; and
averaging the product to generate the relative output signal proportional to the absolute temperature.

19. The method of claim 18, further comprising calibrating the relative output signal to the absolute temperature.

* * * * *

UNITED STATES PATENT AND TRADEMARK OFFICE
CERTIFICATE OF CORRECTION

| | | |
|---|---|---|
| PATENT NO. | : 7,862,232 B2 | Page 1 of 1 |
| APPLICATION NO. | : 11/862831 | |
| DATED | : January 4, 2011 | |
| INVENTOR(S) | : Nail Khaliullin | |

It is certified that error appears in the above-identified patent and that said Letters Patent is hereby corrected as shown below:

In column 7, line 43, in Claim 3, after "wherein" insert -- the --.

In column 8, line 3, in Claim 8, delete "voltage." and insert -- voltage --, therefor.

In column 8, line 63, in Claim 16, delete "derived" and insert -- derived, --, therefor.

In column 8, line 63, in Claim 16, delete "art" and insert -- part, --, therefor.

Signed and Sealed this
Eighth Day of March, 2011

David J. Kappos
*Director of the United States Patent and Trademark Office*